Oct. 27, 1942.                L. G. DANIELS                2,299,802
                                  VALVE
               Original Filed April 26, 1937     2 Sheets-Sheet 1
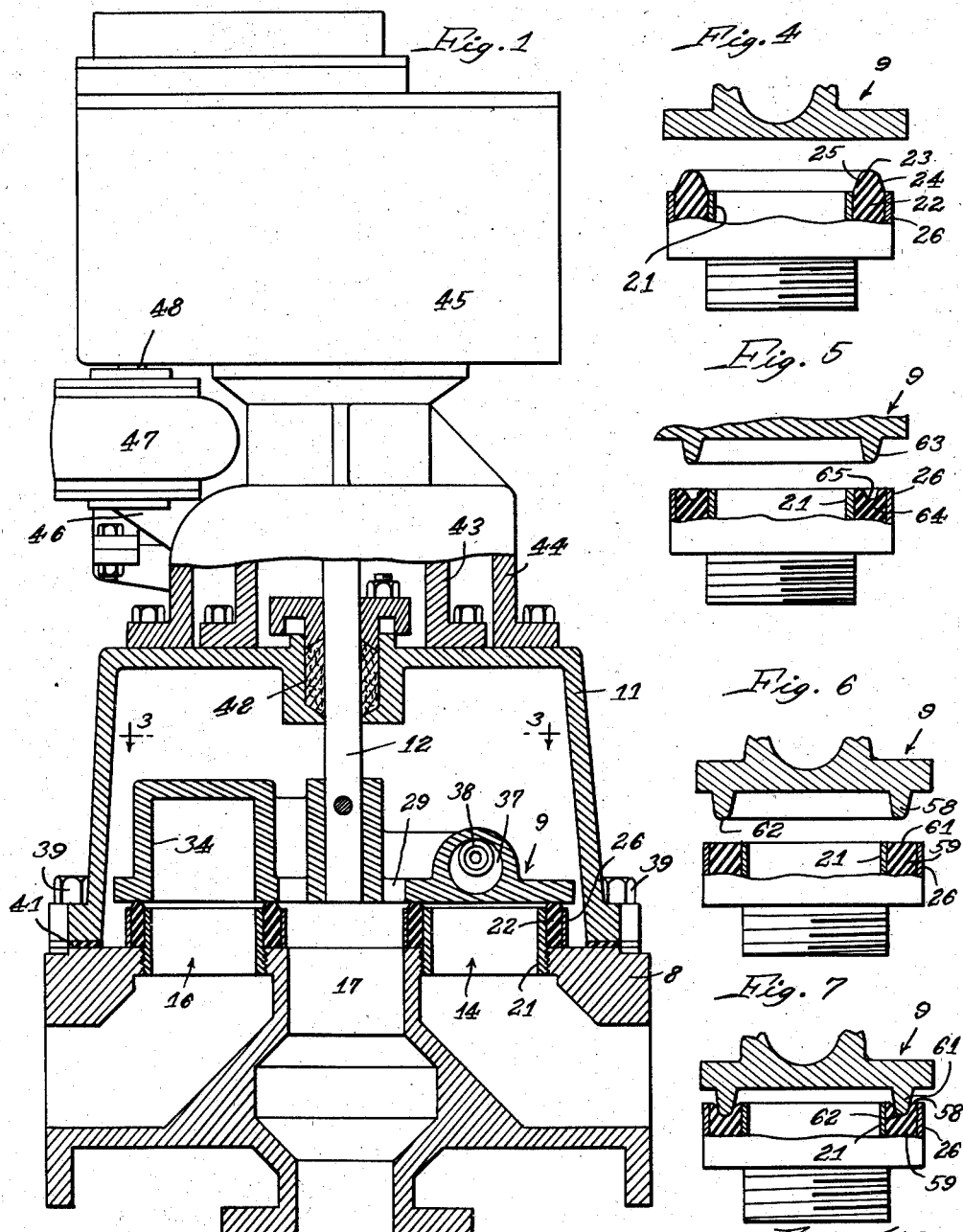

Oct. 27, 1942.    L. G. DANIELS    2,299,802
VALVE
Original Filed April 26, 1937    2 Sheets-Sheet 2
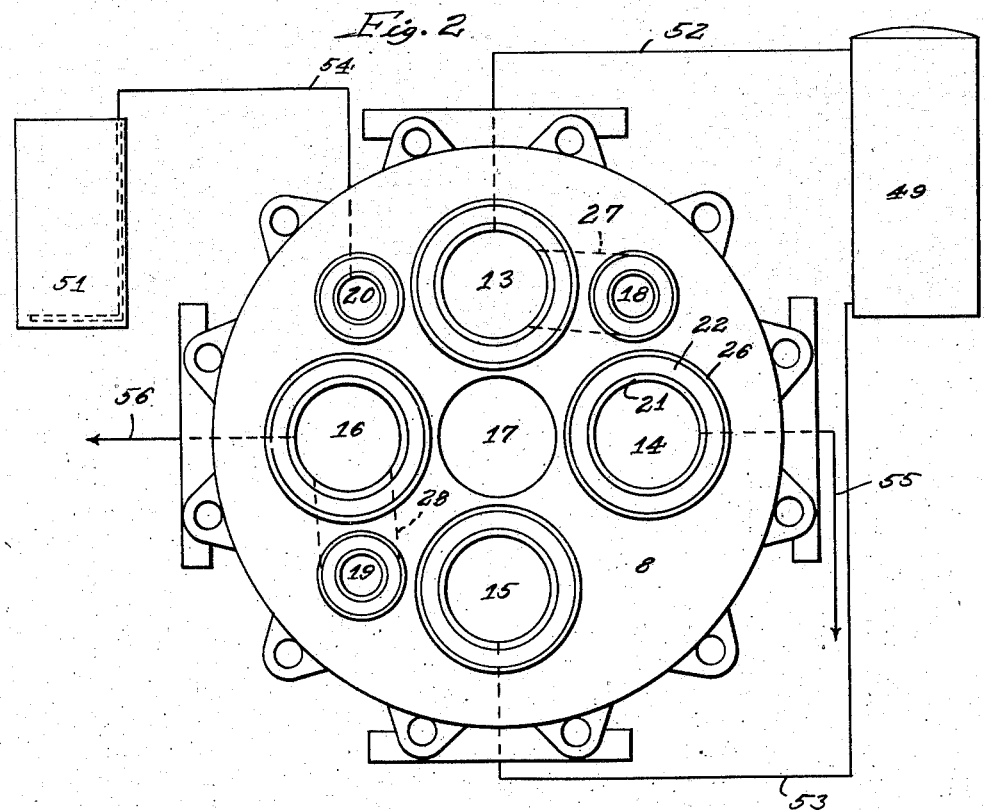
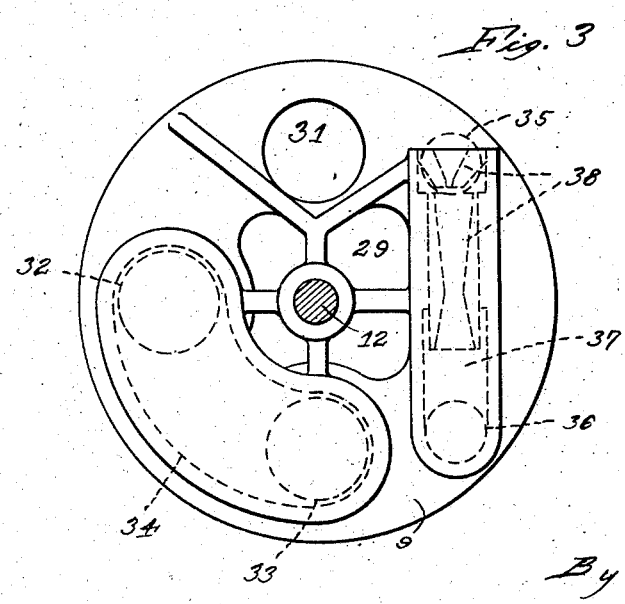
Inventor:
Lee G. Daniels
By
McCanna, Wintercorn & Morsbach
Attys.

Patented Oct. 27, 1942

2,299,802

UNITED STATES PATENT OFFICE 2,299,802

VALVE

Lee G. Daniels, Rockford, Ill.

Original application April 26, 1937, Serial No. 138,948, now Patent No. 2,235,287, dated March 18, 1941. Divided and this application January 31, 1941, Serial No. 376,875

13 Claims. (Cl. 251—84)

This invention relates to valves and more particularly to the structure thereof for sealing the space between the movable and the stationary members of the valve, the invention being particularly directed to multiple port plate type valves.

This is a division of my copending application Serial No. 138,948, filed April 26, 1937, now Patent No. 2,235,287, granted March 18, 1941, entitled "Automatic softener valve."

The primary object of the invention is the provision of a valve having improved valve seat structure for sealing the interface between the movable and stationary elements of the valve in the area around the cooperating ports, and to provide improved gasket elements adapted to cooperate with the valve structure for performing this function in an improved manner.

Another object of the invention is the provision of improved gaskets for multiple port plate type valves arranged to give substantially greater life and service, adapted to be more easily installed and arranged to be manufactured and installed at a substantially lesser cost than gaskets of the prior art.

Other objects and advantages will appear from the following description and the accompanying drawings, in which—

Figure 1 is a side view partly in section through a motor-operated valve embodying my invention;

Fig. 2 is a face view of the valve body member, showing diagrammatically the connection thereof with a water treatment device such as a water softener;

Fig. 3 is a top view of the valve rotor member;

Fig. 4 is a fragmentary section through the gasket and rotor member of Figure 1 showing the rotor in unseated position;

Fig. 5 is a fragmentary view similar to Fig. 4 showing a modified form of gasket and rotor structure;

Fig. 6 is a view similar to Fig. 4 showing a further embodiment of the invention, and Fig. 7 is a view of the structure shown in Fig. 6, showing the rotor member in the seated position.

The valve of the present invention is adapted for a multiplicity of uses, as will be apparent to those skilled in the art, but has herein been shown and described with a port arrangement as used in the control of the flow in a water treatment apparatus such as a Zeolite water softener, such showing being by way of illustration and not limitation. It will be understood that the port arrangement may vary widely as may the specific structure of the valve actuating mechanism, the invention being directed essentially to the gasket and to its manner of cooperation in a valve of the general class disclosed.

In Figure 1 the numeral 8 designates the body or stator member of the valve, the numeral 9 designates the rotor member of plate thereof, the numeral 11 designates the valve housing or cover, and the numeral 12 designates the stem by which the rotor or plate member of the valve is raised and indexed between its various positions.

The valve body 8 has a plurality of ports designated generally by the numerals 13—20 (Fig. 2) extending through the face of the body, the port 17 being an open port and the ports 13, 14, 15, 16, 18, 19 and 20 being annular ports adapted to be sealed as hereinafter described. In one embodiment of the invention the seating surface of the plate 9 is substantially plane as shown in Figure 1. Means are provided for sealing the junction between the rotor and body members at each of the ports comprising a sleeve 21, in this instance threaded into the port and projecting above the face of the body member. Encircling the sleeve 21 is a rubber or similar resilient gasket 22 (Fig. 4), having a projecting portion, in this instance of arcuate cross-section, as shown in Fig. 4 to provide a substantially coplanar face 23 adapted to contact the plate and arcuate inwardly converging side edges 24 and 25 extending upwardly from the plane of the upper edge of the sleeve 21. In other words, the gaskets have narrow resilient faces and the gasket widens out from the faces to give support and resiliency to the face portion and thus better seal the ports when the flat face of the rotor is seated thereon. The upper edges of the sleeves 22 or gasket members extend above the upper edge of the sleeves 21 as shown in Figs. 1 and 4 to provide seats for the rotor member. The sleeves 22 are in turn encircled by a metal retaining member 26 which acts to prevent distortion of the main body of the gasket under the seating pressure of the rotor. As will be seen from a comparison of Figs. 1 and 4, the rotor simultaneously seats against all of the gasket members and is pressed thereagainst with such force as to partially flatten the arcuate ends of the gasket members, and through this distortion to produce a sealing contact therebetween. The ports 13 and 18 and the ports 16 and 19 are interconnected within the body of the valve as indicated at 27 and 28 (Fig. 2).

The stem plate or rotor member 9 has a central open port 29 for communication between the open port 17 of the body member and the valve chamber formed by the cover 11. The stem plate also has an annular port 31 for registration with certain of the stator ports, annular ports 32 and 33 interconnected by a channel 34, and annular ports 35 and 36 interconnected by a channel 37 in which are positioned injector tubes 38 communicating with the valve chamber.

The cover 11 is attached to the stator or body member by means of cap screws 39 spaced around the valve, a gasket 41 being interposed between the cover and body to prevent leakage. A stuffing box 42 is positioned on the face of the cover 11 to prevent leakage along the stem 12, where the stem extends through the cover. Inner and outer concentric sleeves 43 and 44 are carried on one face of the cover 11, the outer end of the sleeve 44 terminating in a housing 45 enclosing the valve actuating mechanism (not shown), the sleeve 43 serving a function as shown in said copending application in the actuation of the valve. A driving motor 46 carried on the valve structure is operatively associated with a gear casing 47 through which a shaft 48 is driven, the shaft 48 operating through the mechanism in the casing 45 to move the stem 12 longitudinally to raise or unseat the plate 9, rotate the plate through the required angularity to bring the ports of the plate into alignment with other ports of the body member and to move the stem longitudinally to reseat the plate and to apply pressure between the plate and the gaskets to seal the space between the plate and body in the area around the respective ports.

In Figs. 2 and 3 I have shown the manner in which the valve structure cooperates in the control of the flow through a conventional zeolite water softener in which the numeral 49 designates a conventional water treatment tank such as that employed for retaining a mineral, the numeral 51 designates a tank for regeneration solution, the numeral 52 designates a hard water line connecting the valve with the top of the tank 49, the numeral 53 designates a conduit for soft water flowing from the softener to the valve, the numeral 54 indicates a line leading from the regeneration solution tank to the valve, the numeral 55 indicates a drain line, and the numeral 56 indicates a service line. In the service potion of the valve, hard water enters the valve through the port 17, passes through the rotor ports 29 and 31, the body port 13 and the conduit 52 to the top of the tank 49, thence through the line 53 to the body port 15, through the rotor port 33, channel 34 and port 31 to the body port 16, and thence through the conduit 56 to service. As the motor is moved in a clockwise direction and the ports thereof brought into successive registration with the ports of the body member, the flow in the softener system will be directed thereby in a obvious manner to conduct the softener through a regeneration cycle and return to service, including the steps of back washing, brining and rinsing, and return to service, and that in the successive steps water will be continuously provided to the service line.

Attention is directed to the advantages of the embodiment of the invention shown in Figs. 1 and 4. It will be seen that with a valve of this character the plate 9 is rotated so that various combinations are obtained between the ports of the plate and the ports of the body member, and that in each position proper sealing effect must be obtained. Under many circumstances this is difficult because of the problem of obtaining an accurately plane surface on the bottom of the plate and causing this surface to remain parallel in all positions with the object against which it seats. This invention permits of proper sealing even though there may be material variations in this respect. Furthermore, the faces 23 of the gaskets seat against a plane surface on the plate so that extreme accuracy is not required in the registration. An important characteristic of the invention is the fact that no sharp edges are provided in the contacting portions of the gasket, and the face 23 is supported by the sloping side of the gasket. In other words, the walls 24 and 25 approach the face 23 in a gradual arc so that the material of the gasket is not unduly distorted in such manner as to cause the development of transverse cracks or breaks in the gasket. A severe difficulty with gaskets of this type in the past, particularly when made of rubber, is the fact that fine hair line cracks begin to appear in the sides of the gasket after a short period of use, which cracks rapidly spread across the gasket and soon become of such magnitude as to prevent proper sealing. I have discovered that by causing all of the surfaces adjacent the area of contact of the gasket with the opposite element to have a curvature, and by imparting adequate support to the contact surface, the inception of these hair line cracks is avoided and the life of the gasket is very greatly prolonged.

Directing attention now more particularly to the form shown in Figs. 6 and 7, the valve, aside from the portion shown in these figures, is identical with that shown in Figure 1, heretofore described. However, in this instance the plate 9 has projecting rings 58 extending annularly of the annular ports and wherever necessary on the face of the plate forming projecting seats around the ports to seal each of the annular ports in each position of the plate. In this form of the invention I have provided a relatively thick cylinder of rubber or similar resilient material 59 having a substantially plane end surface as shown at 61 (Fig. 6). The lower or contacting edge of the rings 58 are accurately shaped as shown at 62 and arranged to press into and seal against the outer ends of the cylindrical gaskets 59 and be depressed therein as shown in Fig. 7 under the pressure applied to the rotor 9 by the rotor stem. In this form of the invention the cylinders 59 are likewise retained in position by sleeves 21 as in Figure 1, threaded into the ports and projecting above the surface of the body member, and are encircled by retaining members 26 as shown in Figure 1, these retaining members being in the form of metal sleeves, the lower edges of which seat against the face of the body member. However, in this form the upper ends of the rubber cylinders are substantially coplanar with the upper ends of the sleeves 21 and retaining members 26 so that these concentric sleeve-like elements lend lateral support to the rubber cylinders during their distortion, as will be seen from Fig. 7.

In Fig. 5 I have shown a further embodiment of the invention, and in this form the body member 8 and rotor 9 are substantially identical with the form shown in Figure 1 with the exception that the rotor member has projecting rings 63 around each of the annular ports and in such other locations as may be necessary to contact each of the gaskets in each seated position of the valve. In this form of the invention sleeves 21 are likewise threaded into the body ports and disposed around these sleeves with one end thereof seated against the face of the body, are relatively thick cylindrical gasket members 64. Surrounding these gasket members are retaining members 26 of metal or other suitable material adapted to seat with one edge against the face of the body member as shown in Figure 1. The outer ends of the cylindrical gaskets are provided with arcuate depressions 65 substantially complemental to the lower edge of the rings 63, whereby in the seated position of the rotor or plate, the rings 63 seat in the arcuate depressions 65 to provide the seal between the body and the plate around each of the ports. It will be seen that this form of the invention is very similar to that shown in Figs. 6 and 7 with the exception that the depressions 65 are formed or molded into the ends of the rubber cylinders. This form of the invention offers certain advantages over those shown in Figs. 4 and 6 in that under adverse conditions it provides a somewhat better sealing action between the two members of the valve, while on the other hand the forms of Figs. 4 and 6 do not require the same degree of accuracy of registration while seating the two members of the valve.

It will be seen that with the forms of the invention shown in Figs. 5 and 6 the portions of the gaskets which are distorted by the seating action of the rotor are provided with plane or arcuate surfaces as distinguished from right angles or sharp corners, and this, as heretofore described, retards the formation of cracks in the gaskets and the resultant premature destruction of the gaskets. This action is augmented in Figs. 5 and 6 by giving the sides of the gaskets complete support so that upon seating of the rotor member the gaskets are not distorted over the retaining members to produce a thin section in which braking action of the type described can occur.

The foregoing description is given for the purpose of disclosing the invention in such manner as to permit the same to be practiced by others, and the specific forms disclose preferred manners for practicing the invention, though I am aware that numerous alterations may be made therein within the spirit of the invention.

I claim:

1. The combination in a multi-port valve of a rotor and a stator member having multiple ports for mutual registration in a plurality of positions, sleeves disposed in the ports of one of said members and projecting therefrom toward the other member, and resilient sealing gaskets in the form of long, longitudinally compressible cylinders encircling said sleeves, the ends of said cylinders abutting against the rotor and the stator in the seated position of the rotor to compress said cylinders in a direction substantially parallel to the axis thereof to effect sealing contact therebetween.

2. The combination in a multiple port valve of a rotor and a stator member having multiple ports for mutual registration in a plurality of rotative positions of the rotor, sleeves disposed in the ports of one of said members and projecting therefrom toward the other member, and resilient gaskets in the form of relatively long, longitudinally compressible cylinders snugly encircling said sleeves, one end of said cylinders abutting against said one of said members, the other end of said cylinders and the other of said members having mutually cooperating contacting surfaces, one of said surfaces having a configuration of arcuate cross-section in the contacting area thereof for producing a sealing distortion of the gasket against said other member upon longitudinal compression of said cylinder in a direction parallel to its axis upon registration of said members.

3. In a multi-port valve, a rotor and a stator member having multiple ports, and means for sealing the junction between the rotor and stator members at each of the ports comprising annular sleeves around each port on one of said members, and an annular tubular resilient gasket confined between the sleeves around each port compressible in a direction parallel to the axis thereof upon seating movement of said members to provide sealing contact at one end with the other member.

4. The combination in a multiple port valve of a rotor and a stator member having multiple ports for mutual registration in a plurality of rotative positions of the rotor, sleeves disposed in the ports of one of said members and projecting therefrom toward the other member, and resilient gaskets in the form of separate cylinders snugly encircling said sleeves, one end of said cylinders being in sealing relation with said one of said members and the other end having an arcuate cross-section for contact with the surface of said other member to seal the ports of said members into communication with said members in spaced relation.

5. The combination recited in claim 2 wherein cylindrical retaining elements are disposed around said cylinders substantially concentric with said sleeves to support said cylinders and limit the distortion thereof under sealing pressure between said members.

6. The combination in a multiple port valve of a rotor and a stator member having multiple ports for mutual registration in a plurality of rotative positions of the rotor, sleeves disposed in the ports of one of said members and projecting therefrom toward the other member, and resilient gaskets in the form of separate cylinders snugly encircling said sleeves, one end of said cylinders projecting in coplanar relation beyond the ends of said sleeves, the projecting portion thereof being of arcuate cross-section for contact with the surface of said other member to seal the ports.

7. The combination in a multiple port valve of a rotor and a stator member having multiple ports for mutual registration in a plurality of rotative positions of the rotor, sleeves disposed in the ports of one of said members and projecting therefrom toward the other member, resilient gaskets in the form of separate cylinders snugly encircling said sleeves, one end of said cylinders projecting in coplanar relation beyond the ends of said sleeves, the projecting portion thereof being of arcuate cross-section for contact with the surface of said other member to seal the ports, and cylindrical retaining elements around said cylinders having an outer end substantially coplanar with the ends of said sleeves, said retaining elements confining said cylinders against excessive lateral distortion under sealing pressure between said members.

8. The combination in a multiple port valve of a rotor and a stator member having multiple ports for mutual registration in a plurality of rotative positions of the rotor, sleeves disposed in the ports of one of said members and projecting therefrom toward the other member, the outwardly disposed ends of said sleeves being substantially coplanar, and resilient gaskets in the form of separate cylinders snugly encircling said sleeves with one end thereof substantially coplanar with the ends of said sleeves, said other member having projecting circular ribs of arcuate cross-section shaped to seat against the ends of said cylinders in the various positions of the valve to effect sealing contact therewith.

9. The combination recited in claim 8 wherein said ends of said cylinders are provided with annular grooves of arcuate cross-section complemental with said ribs and into which said ribs seat in sealing contact.

10. The combination recited in claim 1 wherein retaining elements are disposed around said cylinders to confine the cylinders against excessive lateral distortion under sealing pressure between said members.

11. The combination in a plate type lift-turn valve of a body member and a rotor member each having a plurality of ports arranged to be brought into different communication in different positions of the valve, and gasket means disposed between said members having resilient rubber seats around a plurality of the ports of one of said members projecting toward the other of said members to space said members relative to one another and to establish sealed communication between the ports thereof in the different seated positions of the plate member, said seats being small in wall thickness where they contact the other of said members for high sealing force and of gradually increasing wall thickness toward said one of said members.

12. The combination in a multiple port lift-turn valve of a multiple port body member, and a multiple port rotor member having flat opposing surfaces, gasket means interposed between said surfaces and attached to one of said members, said gasket means including resilient rubber seats projecting toward the other of said members, said seats having narrow faces around the ports for sealing contact with the flat face of said other member, the seats diverging from said narrow faces toward said one of said members to provide resilient support for said narrow faces and to hold said members in spaced relation under the seating pressure of said members.

13. The combination in a plate type lift-turn valve of a body member having a ported surface and a plurality of pipe connections communicating therewith, a rotor member having a ported surface and adapted to be lifted, turned and reseated into different port communication with said body member, said rotor member having a transfer passage, ferrules positioned in the ports of one of said members, resilient rubber sealing means disposed around each of said ferrules compressible by the other of said members to seal the ports and space said members when seated for the presence and free flow of fluid therebetween to counterbalance an equal area of fluid pressure on the opposite side of said rotor member and to thereby reduce the force required to lift the rotor member, and means for lifting and turning said rotor and applying seating pressure thereon.

LEE G. DANIELS.